United States Patent
Reistad (10) Patent No.: US 8,805,945 B2
(45) Date of Patent: *Aug. 12, 2014

(54) METHOD AND SYSTEM FOR MESSAGE PACING

(71) Applicant: Open Text S.A., Luxembourg (LU)

(72) Inventor: Brian Reistad, Sudbury, MA (US)

(73) Assignee: Open Text S.A., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 13/745,192

(22) Filed: Jan. 18, 2013

(65) Prior Publication Data

US 2013/0132494 A1    May 23, 2013

Related U.S. Application Data

(63) Continuation of application No. 13/564,532, filed on Aug. 1, 2012, now Pat. No. 8,386,578, which is a continuation of application No. 13/190,246, filed on Jul. 25, 2011, now Pat. No. 8,260,870, which is a continuation of application No. 12/566,364, filed on Sep. 24, 2009, now Pat. No. 8,065,375, which is a continuation of application No. 11/818,192, filed on Jun. 13, 2007, now Pat. No. 7,647,372, which is a continuation of application No. 11/353,792, filed on Feb. 14, 2006, now Pat. No. 7,389,320, which is a continuation of application No. 09/621,913, filed on Jul. 24, 2000, now Pat. No. 7,127,486.

(51) Int. Cl.
*G06F 15/16* (2006.01)

(52) U.S. Cl.
USPC .......................................... 709/206; 709/223

(58) Field of Classification Search
CPC ....... H04L 51/00; H04L 51/04; H04L 51/043; H04L 51/046; H04L 51/06; H04L 51/18; G06Q 30/02
USPC ............... 709/203, 206, 207, 223; 379/88.22, 379/266.08; 455/412.1, 414.1
See application file for complete search history.

(56) References Cited

U.S. PATENT DOCUMENTS 4,625,081 A * 11/1986 Lotito et al. ................ 379/88.26
5,073,142 A * 12/1991 Kasai et al. ...................... 452/51

(Continued)

FOREIGN PATENT DOCUMENTS

| EP | 0371607 A2 | 6/1990 |
|----|------------|--------|
| EP | 0371607 A3 | 6/1990 |

(Continued)

OTHER PUBLICATIONS

Notice of Allowance for U.S. Appl. No. 13/528,152, mailed Apr. 12, 2013, 6 pgs.

(Continued)

*Primary Examiner* — Frantz Jean
(74) *Attorney, Agent, or Firm* — Sprinkle IP Law Group (57) ABSTRACT

A system for managing message volume and timing, which permits first and second messages to be spaced apart over time, with the pacing controlled in part by a characteristic of the second message. The system sends the first message to an intended recipient. The system determines a separation based on a pacing algorithm and sends the second message to the recipient according to the separation.

18 Claims, 7 Drawing Sheets

(56) References Cited

U.S. PATENT DOCUMENTS

| | | | |
|---|---|---|---|
| 5,153,905 A | 10/1992 | Bergeron et al. | |
| 5,548,506 A | 8/1996 | Srinivasan | |
| 5,646,982 A | 7/1997 | Hogan et al. | |
| 5,802,299 A | 9/1998 | Logan et al. | |
| 5,848,397 A | 12/1998 | Marsh et al. | |
| 5,892,909 A | 4/1999 | Grasso | |
| 5,937,037 A | 8/1999 | Kamel et al. | |
| 5,937,162 A * | 8/1999 | Funk et al. | 709/206 |
| 5,970,491 A | 10/1999 | Schreiber et al. | |
| 6,073,142 A | 6/2000 | Geiger et al. | |
| 6,076,101 A | 6/2000 | Kamakura et al. | |
| 6,101,545 A * | 8/2000 | Balcerowski et al. | 709/230 |
| 6,236,977 B1 | 5/2001 | Verba et al. | |
| 6,304,550 B1 | 10/2001 | Fox | |
| 6,332,164 B1 | 12/2001 | Jain | |
| 6,351,745 B1 | 2/2002 | Itakura et al. | |
| 6,446,113 B1 | 9/2002 | Ozzie et al. | |
| 6,571,238 B1 | 5/2003 | Pollack et al. | |
| 6,701,322 B1 | 3/2004 | Green | |
| 6,732,185 B1 | 5/2004 | Reistad | |
| 6,854,007 B1 | 2/2005 | Hammond | |
| 6,965,870 B1 | 11/2005 | Petras et al. | |
| 6,965,920 B2 | 11/2005 | Pedersen | |
| 7,003,517 B1 | 2/2006 | Seibel et al. | |
| 7,092,821 B2 | 8/2006 | Mizrahi et al. | |
| 7,127,486 B1 | 10/2006 | Reistad et al. | |
| 7,277,863 B1 | 10/2007 | Hilerio et al. | |
| 7,284,066 B1 | 10/2007 | Philyaw et al. | |
| 7,346,655 B2 | 3/2008 | Donoho et al. | |
| 7,389,320 B2 | 6/2008 | Reistad et al. | |
| 7,647,372 B2 | 1/2010 | Reistad et al. | |
| 7,925,531 B1 | 4/2011 | Cunningham et al. | |
| 7,975,007 B2 | 7/2011 | Reistad et al. | |
| 8,065,375 B2 | 11/2011 | Reistad | |
| 8,234,334 B2 | 7/2012 | Reistad et al. | |
| 8,255,460 B2 | 8/2012 | Reistad et al. | |
| 8,260,870 B2 | 9/2012 | Reistad | |
| 8,386,578 B2 | 2/2013 | Reistad | |
| 2001/0034723 A1 | 10/2001 | Subramaniam | |
| 2001/0034769 A1 | 10/2001 | Rast | |
| 2001/0042136 A1 | 11/2001 | Guedalia et al. | |
| 2002/0032638 A1 | 3/2002 | Arora et al. | |
| 2002/0032742 A1 | 3/2002 | Anderson | |
| 2002/0046091 A1 | 4/2002 | Mooers et al. | |
| 2002/0099812 A1 | 7/2002 | Davis et al. | |
| 2005/0209914 A1 | 9/2005 | Nguyen et al. | |
| 2006/0031412 A1 | 2/2006 | Adams et al. | |
| 2006/0184557 A1 | 8/2006 | Pollack et al. | |
| 2006/0224903 A1 | 10/2006 | Ginter et al. | |
| 2008/0000812 A1 | 1/2008 | Reistad et al. | |
| 2010/0050091 A1 | 2/2010 | Reistad | |
| 2011/0225237 A1 | 9/2011 | Reistad | |
| 2011/0282956 A1 | 11/2011 | Reistad | |
| 2012/0259921 A1 | 10/2012 | Reistad et al. | |
| 2012/0297001 A1 | 11/2012 | Reistad | |

FOREIGN PATENT DOCUMENTS

| | | |
|---|---|---|
| JP | 10-065730 | 3/1998 |
| WO | WO 96/13013 A1 | 5/1996 |
| WO | WO 99/52026 A2 | 10/1999 |
| WO | WO 01/09799 A1 | 2/2001 |
| WO | WO 01/69432 A3 | 9/2001 |
| WO | WO 02/08938 A2 | 1/2002 |

OTHER PUBLICATIONS

International Search Report for International Patent Application No. PCT/US2001/021403, mailed Nov. 10, 2003, 7 pgs.

Anonymous, "IMA's Internet Exchange Messaging Server: Assuring Fast and Reliable Communications over the Net" Internet Exchange News, Online!, vol. 2, No. 2, Feb. 1999, pp. 1-4.

"OS/2 Office: Delayed Delivery for Mail Items", IBM Technical Disclosure Bulletin, IBM Corp., New York, U.S., Col. 34, No. 9, Feb. 1, 1992, pp. 381-382.

Borenstein, N., "Internet Multimedia Mail with MIME: Emerging Standards for Interoperability", IFIP Transactions C. Communications Systems, Elsevier Science B.V., Amsterdam, Netherlands, vol. C07, 1992, pp. 183-192.

"Auto-Elimination of Duplicate In-Basket Items in Electronic Mail" IBM Technical Disclosure Bulletin, IBM Corp., New York, U.S., vol. 36, No. 3, Mar. 1, 1993, pp. 403-405.

Office Action for U.S. Appl. No. 09/621,913, mailed Mar. 12, 2004, 6 pgs.

Office Action for U.S. Appl. No. 11/353,792, mailed Dec. 14, 2006, 11 pgs.

Office Action for U.S. Appl. No. 11/353,792, mailed Aug. 10, 2007, 11 pgs.

International Preliminary Examination Report on Patentability for International Patent Application No. PCT/US2001/021403, mailed May 4, 2006, 5 pgs.

Office Action for U.S. Appl. No. 09/621,719, mailed Jul. 16, 2002, 8 pgs.

Office Action for U.S. Appl. No. 09/621,719, mailed Mar. 17, 2003, 9 pgs.

Office Action for U.S. Appl. No. 09/621,719, mailed Sep. 10, 2003, 9 pgs.

Office Action for U.S. Appl. No. 12/546,981, mailed Sep. 17, 2010, 7 pgs.

Office Action for U.S. Appl. No. 12/566,364, mailed Nov. 29, 2010, 9 pgs.

Office Action for U.S. Appl. No. 12/566,364, mailed May 13, 2011, 8 pgs.

Notice of Allowance for U.S. Appl. No. 12/546,981, mailed Mar. 2, 2011, 8 pgs.

Notice of Allowance for U.S. Appl. No. 12/566,364, mailed Aug. 11, 2011, 9 pgs.

Office Action for U.S. Appl. No. 12/546,220, mailed Sep. 6, 2011, 8 pgs.

Office Action for U.S. Appl. No. 13/110,342, mailed Sep. 6, 2011, 9 pgs.

Office Action for U.S. Appl. No. 13/190,246, mailed Oct. 6, 2011, 13 pgs.

Notice of Allowance for U.S. Appl. No. 13/190,246, mailed Feb. 1, 2012, 7 pgs.

Notice of Allowance for U.S. Appl. No. 12/546,220, mailed Mar. 2, 2012, 4 pgs.

Notice of Allowance for U.S. Appl. No. 13/110,342, mailed Mar. 16, 2012, 3 pgs.

Notice of Allowance for U.S. Appl. No. 13/190,246, mailed May 10, 2012, 4 pgs.

Notice of Allowance for U.S. Appl. No. 13/564,532, mailed Oct. 11, 2012, 5 pgs.

Office Action for U.S. Appl. No. 13/528,152, mailed Oct. 12, 2012, 8 pgs.

Notice of Allowance issued for U.S. Appl. No. 13/528,152, mailed Aug. 16, 2013, 9 pages.

Notice of Allowance issued for U.S. Appl. No. 13/528,152, mailed Dec. 16, 2013, 8 pages.

"Livelink Administration: Introduction to livelink," Livelink ® Version 8, Copyright © 1995-1999, Open Text Inc., 167 pages.

"Livelink Help: Task Lists," Livelink ® Version 8, Copyright © 1995-1999 by Open Text Inc., 5 pages.

"Livelink Help: Create a Workflow Map," Livelink ® Version 8, Copyright © 1995-1999 by Open Text Inc., 38 pages.

"Livelink Help: Workflow Overview," Livelink ® Version 8, Copyright © 1995-1999 by Open Text Inc., 22 pages.

"Livelink Help: Change Agents Overview," Livelink c® Version 8, Copyright © 1995-1999 by Open Text Inc., 10, pages.

"Livelink Help: Users and Groups," Livelink ® Version 8, Copyright © 1995-1999 by Open Text Inc., 13 pages.

"Livelink Help: Projects," Livelink ® Version 8, Copyright © 1995-1999 by Open Text Inc., 18 pages.

"Livelink Help: Glossary," Copyright © 1995-1999 by Open Text Inc., 13 pages.

"Livelink Intranet: Web Client-Quick Start," Copyright © 1997 by Open Text Corporation, 113 pages.

(56) References Cited

OTHER PUBLICATIONS

"Livelink: Livelink⁸—Quick Start," Open Text Livelink ®, Copyright © 1995-1998 by Open Text Corporation, 108 pages.
"Livelink Intranet: Web Client User's Guide," Version 7.1, Copyright © 1996 by Open Text Corporation, 202 pages.
"Livelink Intranet: Livelink Change Agents ™—Notification User's Guide," Open Text Intranet, Copyright © 1997 by Open Text Corporation, 32 pages.
"Livelink Intranet: Wide Client User's Guide," Version 7.1, Copyright © 1996 by Open Text Corporation, 278 pages.
"Livelink Intranet: Evaluation Kit—Tutorial," Version 7.0, Oct. 1996, Copyright © 1996 by Open Text Corporation, 59 pages.
"Livelink: Intranet Suite—Tour Guide," Document revision 7.1c, Jan. 1997, Copyright © 1997 by Open Text Corporation, 28 pages.
"Livelink Intranet: Client and System—Administrator's Guide," Document revision 7.1d, Copyright © 1997 by Open Text Corporation, 162 pages.
Balla et al., "Marketfouc Report—Executive Brief: Functional Assessment of Open Text myLivelink," Doculabs 2000 ©, 16 pages.
"Livelink: Installation Guide," Open Text Corporation, Copyright © 1999 by Open Text Corporation, 212 pages.
"Livelink: Livelink API Developers's Reference," Open Text Intranet, Copyright © 1999 by Open Text Corporation, 544 pages.
"What is Livelink Intranet?" retrieved from <<http://web.archive.org/web/19961113034156/http://www.opentext.com/livelink/otm_11_11.html[7/4/2012 1:01:59 PM>>], 4 pages.
"Livelink8®: Frequently Asked Questions," May 11, 1998, 14 pages.
"Livelink® 9.0 Feature Preview," Open Text Corporation, Jun. 13, 2000, 15 pages.
"Livelink® 9.0.0 New Feature List," Open Text Corporation, Oct. 2000, 16 pages.
"Livelink OnTime®—What is Livelink OnTime?" Open Text Corporation, Copyright © 2000 by Open Text Corporation, 2 pages.
"Livelink® 9.0.0 Product Summary," Open Text Corporation, Oct. 2000, 57 pages.
"myLivelinkTM—What is myLivelink?" Open Text Corporation, Copyright © 2000 by Open Text Corporation, 2 pages.
"Livelink® QuickStart for Users," Open Text Corporation, Copyright © 2000 by Open Text Corporation, 76 pages.
"Livelink: QuickStart for Users," Open Text Corporation, Copyright © 1999 by Open Text Corporation, 96 pages.
"Livelink Intranet: Intranet Server and Search Installation Guide," Copyright © 1997 by Open Text Corporation, 93 pages.
"Livelink Intranet: Developer's Guide—Web Client," Copyright © 1997 by Open Text Corporation, 466 pages.
"Livelink Intranet: Put Your Company's Web to Work" 2 pages.
"Livelink⁸—Installation Guide," Open Text Intranet, Copyright © 1998 by Open Text Corporation, 233 pages.
Notice of Allowance issued for U.S. Appl. No. 13/528,152, mailed Mar. 27, 2014, 7 pages.

* cited by examiner

METHOD AND SYSTEM FOR MESSAGE PACING

CROSS-REFERENCE TO RELATED APPLICATIONS

This application is a continuation of, and claims a benefit of priority under 35 U.S.C. 120 of the filing date of U.S. patent application Ser. No. 13/564,532, by inventor Brian Reistad, entitled "METHOD AND SYSTEM FOR MESSAGE PACING," filed Aug. 1, 2012, which is a continuation of, and claims a benefit of priority under 35 U.S.C. 120 of the filing date of U.S. patent application Ser. No. 13/190,246, by inventor Brian Reistad, entitled "METHOD AND SYSTEM FOR MESSAGE PACING," filed Jul. 25, 2011, issued as U.S. Pat. No. 8,260,870, which is a continuation of, and claims a benefit of priority under 35 U.S.C. 120 of the filing date of U.S. patent application Ser. No. 12/566,364, by inventor Brian Reistad, entitled "METHOD AND SYSTEM FOR MESSAGE PACING" filed Sep. 24, 2009, issued as U.S. Pat. No. 8,065,375; which is a continuation of, and claims a benefit of priority under 35 U.S.C. 120 of the filing date of U.S. patent application Ser. No. 11/818,192 by inventors Brian Reistad et al., entitled "METHOD AND SYSTEM FOR FACILITATING MARKETING DIALOGUES filed Jun. 13, 2007, issued as U.S. Pat. No. 7,647,372; which is a continuation of, and claims a benefit of priority under 35 U.S.C. 120 of the filing date of U.S. patent application Ser. No. 11/353,792 entitled "METHOD AND SYSTEM FOR FACILITATING MARKETING DIALOGUES" filed on Feb. 14, 2006, issued as U.S. Pat. No. 7,389,320; which is a continuation of, and claims a benefit of priority under 35 U.S.C. 120 of the filing date of U.S. patent application Ser. No. 09/621,913 by inventors Brian Reistad et al., entitled "METHOD AND SYSTEM FOR FACILITATING MARKETING DIALOGUES" filed on Jul. 24, 2000, issued as U.S. Pat. No. 7,127,486, all of which are fully incorporated herein by reference.

FIELD OF THE INVENTION

This invention relates to methods and systems for managing online and other communications.

BACKGROUND OF THE INVENTION

With the growth of use of the Internet, more and more people have access to e-mail, and more and more entities use e-mail to communicate with customers, potential customers, or other people of interest. In, for example, a marketing context, companies periodically send e-mails to customers with new product information, special offers, company news, or other information.

As a result, recipients find themselves receiving more e-mails than they want to read. Recipients may get angry at the sender, may "opt-out" of further mailings (if that option is available), or may simply stop reading the mailings. Thus, the benefits from sending mailings are reduced and recipients may not get information they otherwise would have found useful.

SUMMARY OF THE INVENTION

According to the present invention, message volume and timing is managed, preferably for both messages from a single message source and messages from multiple, independent message sources. In one embodiment, a centralized message pacing system is used, which regulates when messages are sent to recipients. In another embodiment, each message source uses a commonly-accessible data repository to determine when it sends messages, so that the timing of messages from each message source is coordinated.

The invention permits messages to be spaced at regular or other periods, depending on the type of message, its priority, or other factors. In addition, the invention permits messages to be combined in accordance with a set of rules, so as to reduce the number of separate messages that each recipient receives. Also, the invention permits the pacing of messages to be monitored, so that if a message is not sent to a recipient within a specified time period, one or more message sources are notified. Either the sender or the recipient can have control over the message pacing, both with respect to the timing of messages and the types of messages.

The invention is applicable generally to various types of communications channels. In a preferred embodiment, the invention is used in conjunction with a marketing system, such as the system described in commonly-assigned patent application Ser. No. 09/621,913, entitled "Method and System for Facilitating Marketing Dialogues," which is incorporated herein by reference.

DETAILED DESCRIPTION OF PREFERRED EMBODIMENTS

Figure 1:
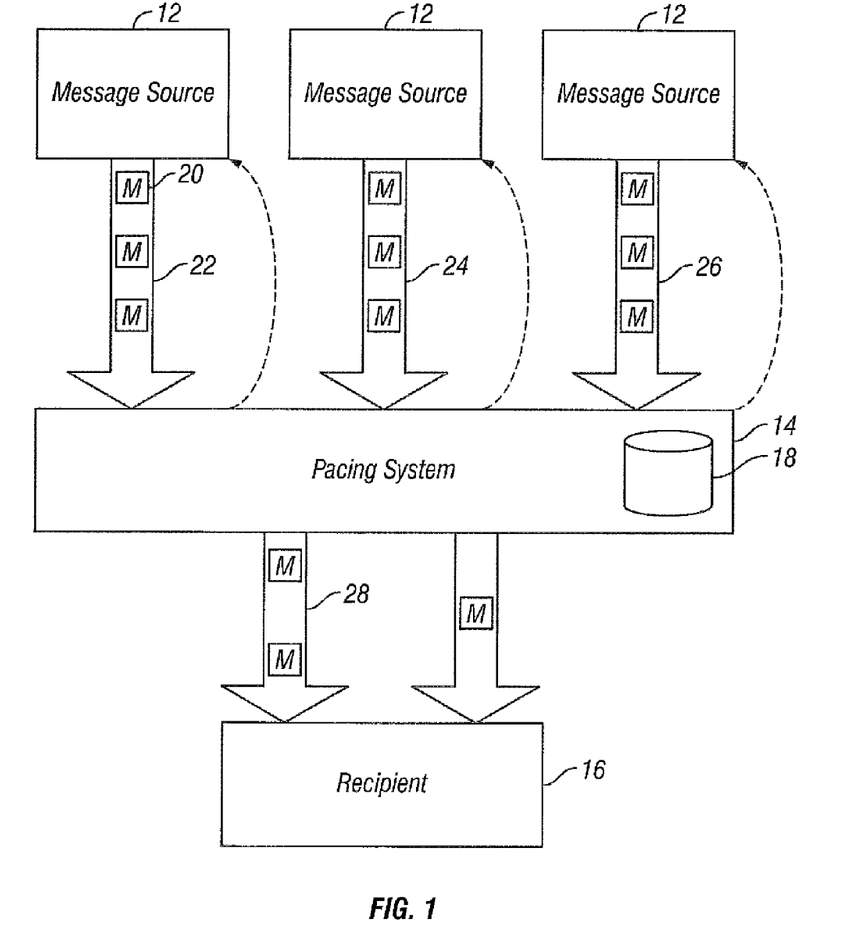
FIG. 1 is a block diagram of a system according to an embodiment of the present invention.

Referring to FIG. 1, a network includes various message sources 12, a pacing system 14, and a recipient 16. Although only a single recipient is shown, for clarity, it is understood that the pacing system may be applied to multiple recipients. Pacing system 14 includes a data storage system 18, such as a database system, that is used to store pacing and message information. Messages 20 intended for recipient 16 (and possibly for other recipients as well) are sent from message sources 12 over communication paths 22, 24, and 26 to pacing system 14. Although shown as separate communication paths, paths 22, 24, and 26 could all be part of a single network, such as the Internet. The communication paths also could involve wide area networks (WANs), local area networks (LANs), dedicated communication paths, or any other communication channel. Or, the message sources 12 and pacing system 14 could be components on the same system, using direct procedure calls or inter-process communications.

Pacing system 14 forwards messages 20 on to recipient 16 over one or more channels 28 according to a pacing algorithm. For example, messages may be delivered no more than once every n time units (such as once every 7 days). The value of n can be different for each recipient, and can vary for different types of messages or different delivery channels. In a preferred embodiment, one channel 28 is an e-mail channel and a second channel is a phone channel. Facsimiles, pagers, regular mail, and any other communication channel could also be included.

Figure 2:
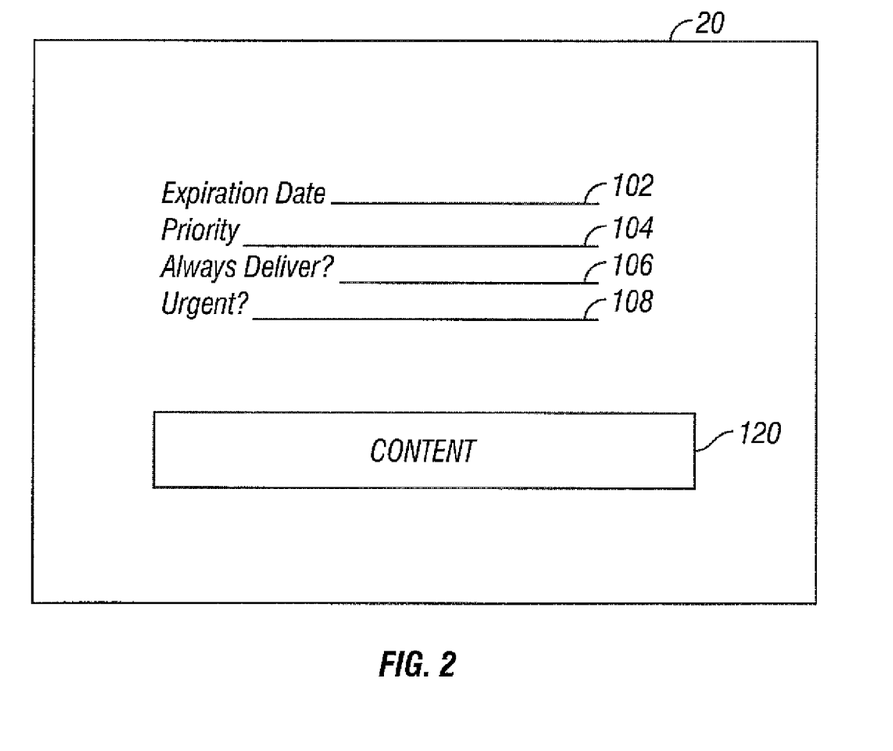
FIG. 2 is a representation of a structure for use with an embodiment of the present invention.

Preferably, as shown in FIG. 2, each message 20 that pacing system 14 receives has, in addition to its content 120 (including the identity of the recipient, the recipient's address, and the message to be delivered), a set of delivery properties, including: an expiration date 102 and a priority 104. After the expiration date, the message will be discarded if it has not yet been delivered. Optionally, some messages can have no expiration date. In a preferred embodiment, there are three levels of priority, high, normal, and low, with normal being the default value. Generally, higher priority messages are delivered before lower priority messages. However, the priority can be treated as one factor, along with the expiration date, in determining which message to deliver. Some messages also may be marked as "always deliver," (field 106 in FIG. 2) indicating that it should be delivered before its expiration date, even if that would be sooner than provided by the pacing algorithm. For example, if messages are to be delivered no more than once every 7 days, and an "always deliver" message would expire 4 days after the last message was delivered, then it would be delivered after 4 days. Preferably, the 7 day period would be restarted after the "always deliver" message is sent. Optionally, messages can be marked as "urgent" (field 108) and delivered immediately, regardless of when the last message was delivered. An "urgent" message may or may not re-set the delivery timer.

According to one embodiment, pacing system 14 will accept each message it receives from each message source 12. Other than with "always deliver" or "urgent" messages, pacing system 14 then waits until n time units after it sent the last message to recipient 16. Pacing system 14 then considers all messages that have not been delivered and have not expired. The message properties are then used to select a message to deliver, For example, pacing system 14 could select the message with the shortest expiration date, using priority as a tie-breaker. Or, pacing system 14 could select the message with the highest priority, using expiration date as a tie-breaker.

Also, combinations of these and other properties of the message can be considered. For example, the recipient could designate certain senders as higher priority than other senders. In addition, pacing system 14 can treat message channels individually or in combinations. Thus, messages sent by e-mail may have no effect on the timing of telephone calls (and vice versa), messages sent by e-mail and telephone calls could be treated together for timing (that is, no call is made or e-mail sent until n days after the last call or e-mail), or some combination of these extremes could be used. For example, calls could be separated by at least 14 days and e-mails could be separated by at least 7 days, with the added requirements that an e-mail cannot be sent for at least 3 days after a call and a call cannot be made for at least 4 days after an e-mail. As another example, message timing can be based at least in part on categorized message types.

Figure 3:
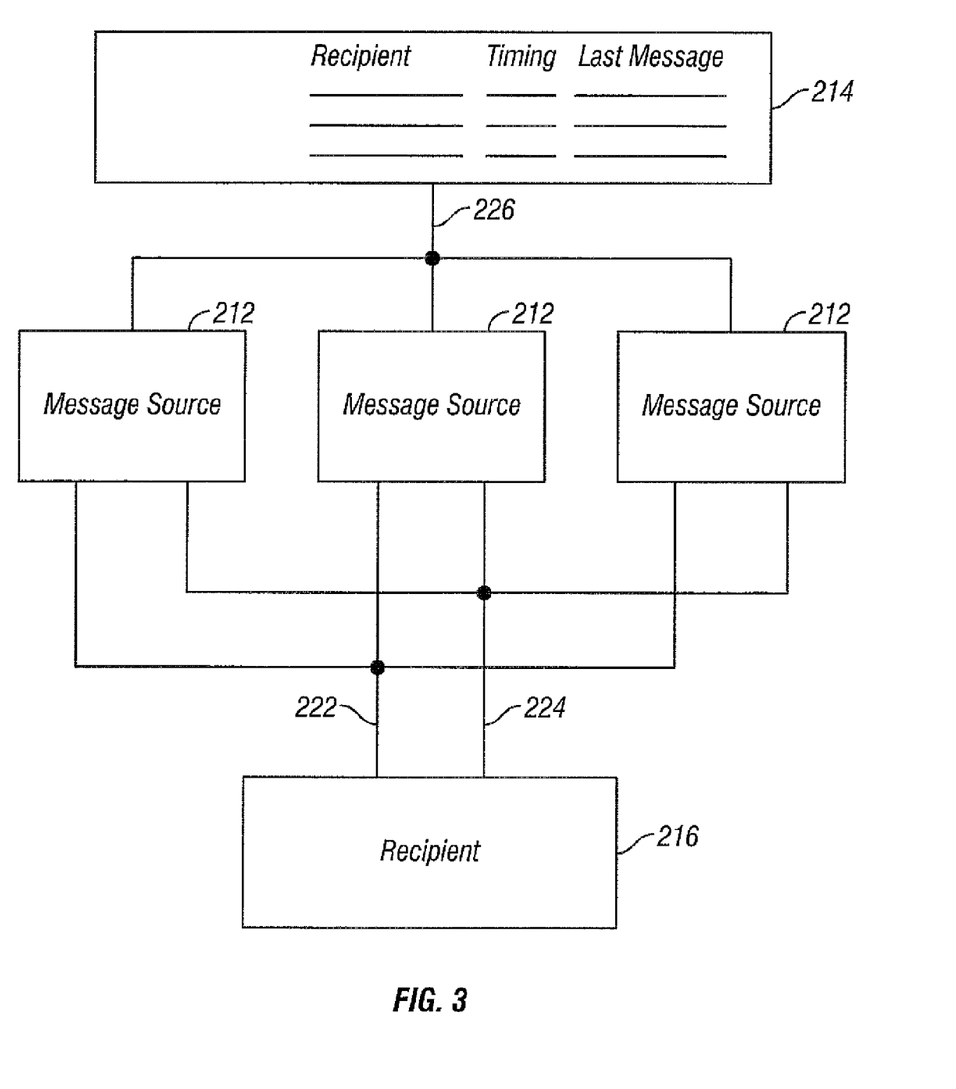
FIG. 3 is a block diagram of a system according to an embodiment of the present invention.

Instead of a centralized pacing system, a central pacing storage system 214 can be used, as shown in FIG. 3. In this embodiment, each message source 212 sends messages directly to recipient 216, through channel 222 or channel 224. For example, channel 222 could be an e-mail channel and channel 224 a phone channel. Although only two channels are shown, it is understood that more channels could be used. In addition, each message source 212 is connected to pacing storage system 214 over network 226. Of course, it is understood that network 226 and one of the channels (such as e-mail channel 222) could overlap (if, for example, both use the Internet). Pacing storage system 214 maintains for each recipient 216 message managing information, such as a record with the value of n (the timing between messages) and the date the last message was sent to that recipient. If the value of n is global for all recipients (or a group of recipients), then it is understood that its value may be maintained for each recipient without storing separate instances of the value for each recipient. Where appropriate, pacing storage system 214 may maintain records of the date the last message was sent on each channel or in each category.

When a message source 212 is ready to send a message to a particular recipient, the message source checks with pacing storage system 214 to determine when the last message was sent and the timing interval n. Or, message source 212 may make a request for whether a message can be sent to the recipient, in which case pacing storage system 214 would calculate whether the current date is greater than the date the last message was sent plus the timing interval, and respond to message source 212. If the new message can be-sent, message source 212 sends the message and informs pacing storage system 214, so that the date of the last message can be updated. If the current time is less than the timing interval since the last message was sent, then message source implements a pacing algorithm to determine when to try again. For example, the message source could wait until the end of the interval and then check again. Or, if this is an "always deliver" message, the message source would wait until the message is about to expire and then send the message.

The message gap can vary based on the priority of the message. For example, the message gap for a high priority message could be 3 days (that is, 3 days since the last contact of any priority), with the message gap for a normal priority message 7 days, and the message for a low priority message 14 days. Also, the message gap can vary based on the prior message. So, for example, a low priority message can be sent 7 days after a high or normal priority message, but not for 14 days after a low priority message.

In a preferred embodiment, pacing system 14 uses storage system 18 to keep track of the message gap or gaps (which can be a global value, or personalized for each recipient), and the following information for each recipient: $T_{last}$ (the date of the last contact, which could be never); $T_{next}$ (the earliest date at which the recipient can be contacted); and $S_{msgs}$ (the set of messages to be sent to the recipient). For each message, pacing system 14 records the arrival date, so that messages with the same priority and expiration date can be processed according to a "first-come, first-served" algorithm.

Figure 4:
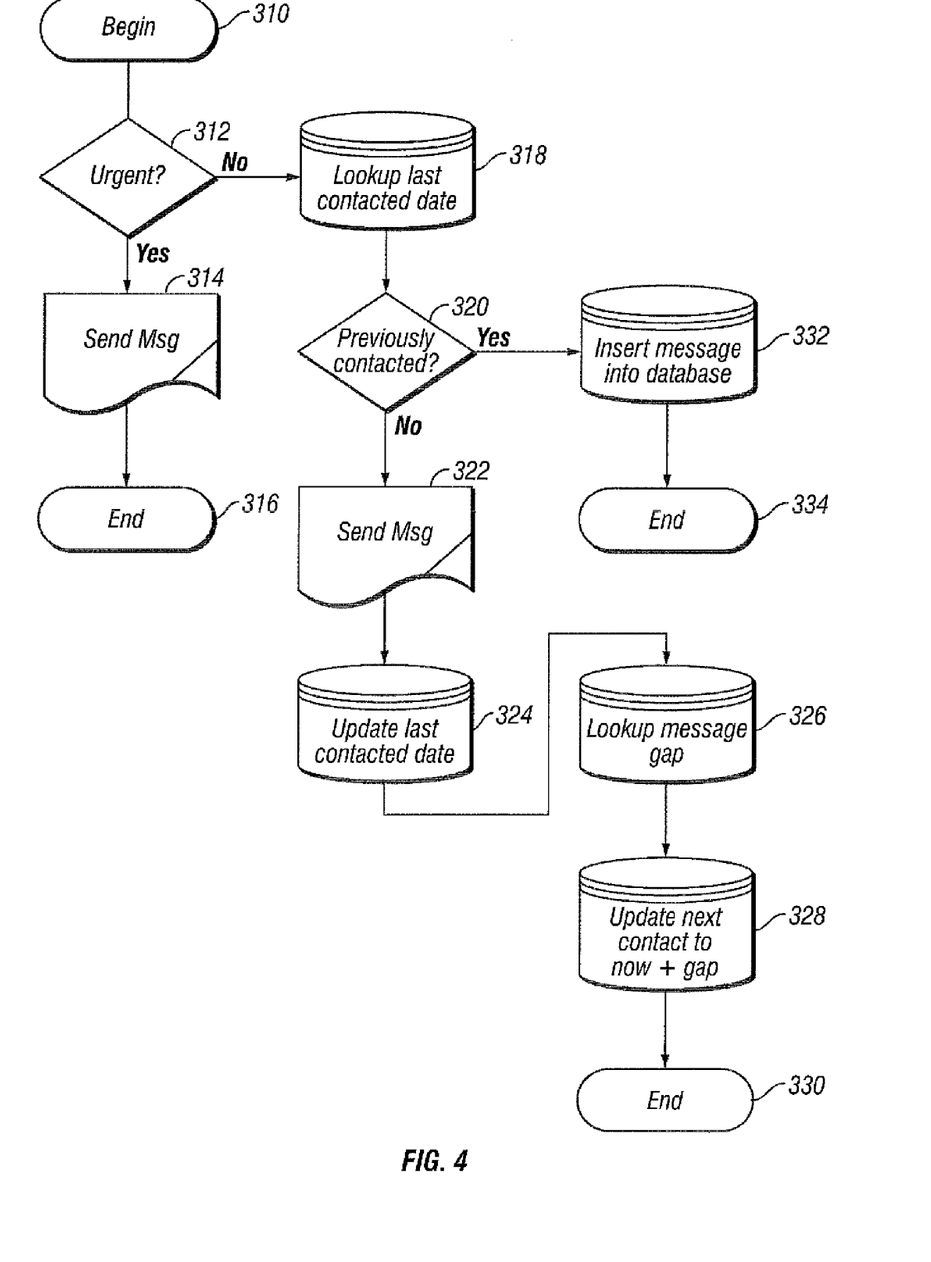
FIG. 4 is a flow diagram of steps performed according to an embodiment of the present invention.

One way for the pacing system to decide, as each new message arrives, whether it should be sent immediately or placed in the data store, is shown in FIG. 4. A message arrives at step 310. Pacing system 14 then determines (step 312) whether the message is marked "urgent." If so, the message is sent (step 314) and the process ends (step 316). It is assumed, with this example, that urgent messages do not cause the timer gap to be reset. If the message had not been marked urgent, the pacing system looks up the last contacted date ($T_{last}$), at step 318, and determines if the recipient had previously been contacted (step 320). If the recipient had not previously been contacted, the message is sent (step 322). The pacing system then updates the last contacted date (step 324), looks up the message gap (step 326), and updates the next contact date ($T_{next}$) at step 328. The process then ends (step 330). However, if the pacing system determines at step 320 that the recipient had been contacted, then the message is inserted into the database by updating $S_{msgs}$ (step 332). The process then ends (step 334). Alternatively, the lookup message gap and update next contact date steps (steps 326 and 328) can be performed if the recipient previously had been contacted. In this case, those steps preferably would be performed after inserting the message in the database at step 332. With this alternative, the pacing system would not "wake up" (as discussed below) unless a message is waiting in the database.

This process also can be implemented in a number of other ways. For example, the system could let the next contact date have a value of "immediately" when the last message gap has expired (or no messages previously have been sent), and use that value at step 318 (instead of the last contacted date) to determine whether a message should be sent. Similarly, the system could check whether the next contact date is prior to the current time. Or, a separate flag (such as a "window open" flag) could be tested at step 320 to determine whether a message can be sent immediately.

Using timers or periodic queries, pacing system 14 "wakes up" when the next contact date arrives. The pacing system then determines which message to send, then resets the message dates.

Figure 5:
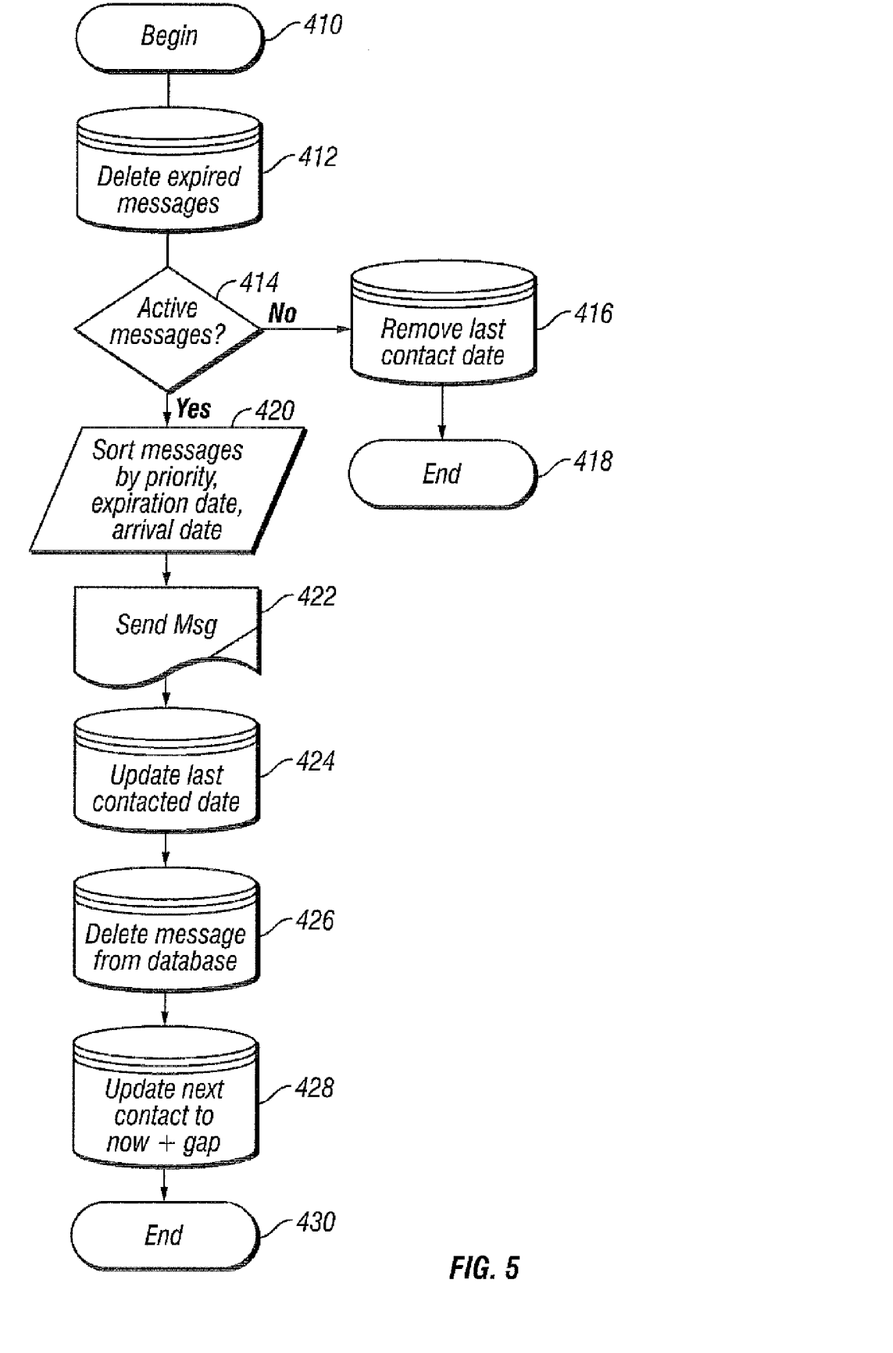
FIG. 5 is a flow diagram of steps performed according to an embodiment of the present invention.

One way to implement this process is shown in FIG. 5. At step 410 the process begins. The pacing system first deletes expired messages, at step 412. Then, the pacing determines whether any active messages remain (step 414). If not, then the system deletes the last contacted date (step 416), so that when a new message arrives it will be sent immediately. The process then ends (step 418). If, at step 414, the system determined that one or more active messages remained, the messages preferably are sorted by priority, expiration date, and arrival date (step 420). Alternatively, other selection processes can be used. After sorting the messages, the system sends the highest priority message (step 422). The system then updates the last contacted date $T_{last}$ (step 424), deletes the sent message from the set $S_{msgs}$ (step 426), and updates the next contact date ($T_{next}$) at step 428. The process then ends (step 430). If, instead of checking (at step 320 of FIG. 4) the last contacted date, the system checks for whether the window is open, then step 416 could be omitted. Or, if at step 320 the system checks the next contact date for an "immediate" value or value in the past, then step 416 would be replaced with updating the next contact date to the immediate value, or omitted.

Alternatively, with either of the above systems, to select which message is sent (and when the message is sent) the system (the pacing system, where a centralized pacing system is used, or each message source where a centralized storage system is used) could assign delay times based on the message properties and a random number. In this alternative, the system sends messages during an open window period. The window is open if the last message was sent at least n time units previously, where n is the message gap. The message gap can be the same for all recipients or can vary by recipient. Otherwise, the window is closed and the message is delayed until a point in time shortly after the window is expected to open. If the window is still closed after the delay, the process repeats.

With the use of an open window period, because each message is processed individually, the length of each message delay is staggered, so that messages with a higher priority "wake up" before messages of lower priority. For messages with equal priority, the delay is adjusted so that those with shorter expiration dates wake up before messages with longer expiration dates. For messages with the same priority and expiration date, a random factor is used to ensure they do not wake up at the same time. In a system with a single engine or processor executing the programs for sending messages, it may also be the case that only one message is processed at a time, which will lead to one message being processed first, and the other message then waiting until the window re-opens. Preferably, the wake up time ($T_{wake}$) is determined using the following algorithm:

$$T_{wake}=T_{open}+[\text{priority weight}]+5\text{min}*(20,\text{num\_weeks}\ [T_{exp}-T_{open}])+\text{ran}(0\text{-}5\text{min}),$$

where $T_{open}$ is the time that the window opens, calculated as:

$$T_{open}=(\text{last contacted date}+\text{message gap}).$$

and where $T_{exp}$ is the expiration time (that is, the expiration date of the message) and where [priority weight] is 0 hours for high priority messages, 2 hours for normal priority messages, and 4 hours for low priority messages. Alternatively, a simpler algorithm employing only some of these factors, could be used, or a different algorithm could be used. Also, the algorithm can consider the message channel as well (as discussed above), so that messages in one channel (such as e-mail) are considered independently of messages in another channel (such as phone calls or facsimiles), or so that prior messages in one channel affect when messages can be sent through another channel.

Figure 6:
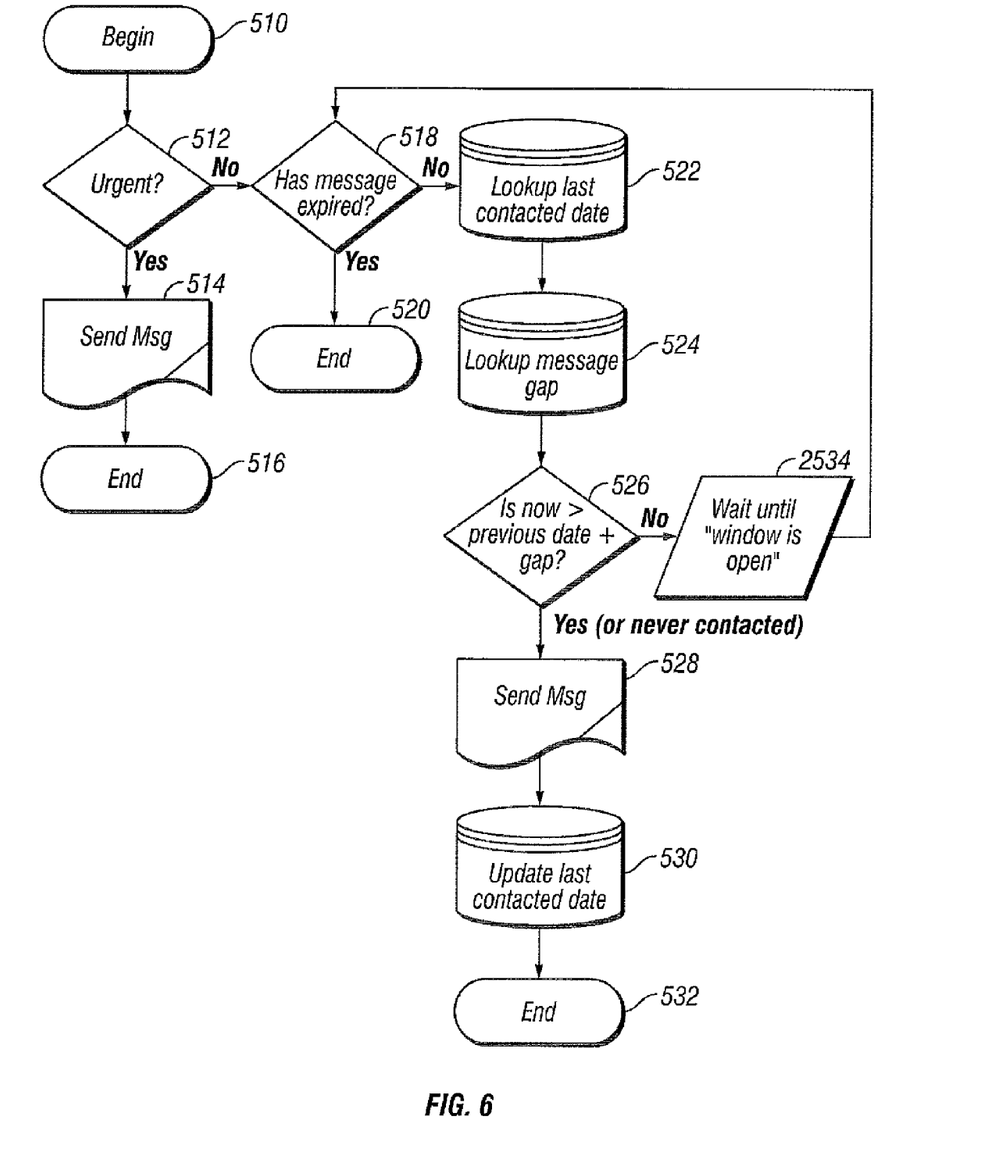
FIG. 6 is a flow diagram of steps performed according to an embodiment of the present invention.

One way to implement this selection process is shown in FIG. 6. The process begins at step 510, when a message arrives or a message wakes up. At step 512, the system determines if a message is marked "urgent." If it is, the message is sent (step 514) and the process ends (step 516). If, at step 512, the message had not been marked urgent, the system determines (step 518) if the message has expired. If so, the process ends (step 520). If not, the system looks up the last contacted date (step 522) and the message gap for this recipient (step 524). The system then checks (step 526) whether the current date is greater than the sum of the last contacted date plus the message gap. If so (or if the recipient had not previously been contacted), then the message is sent (step 528). The system then updates the last contacted date (step 530) and ends (step 532). If the current date was not greater than the sum of the last contacted date plus the message gap (that is, the window is closed), then the system waits (step 534) until the window opens, then returns to step 518. This ensures that the current message will be processed before another message that wakes up while the system waits. The window could be closed, for example, because another message had been sent since the wake-up time for that message had been calculated. Alternatively, if the window was closed, the message could go back to sleep for a specified time period and the process could end, which could mean that another message will be processed before it if the other message wakes up first.

In addition to determining the timing of messages, in a preferred embodiment the pacing system can be used to manage message volume. Message volume management mechanisms include aggregating messages, discarding similar messages, and stimulating messages. Thus, volume management can be used both to reduce and to increase the number of messages, depending on the message volume.

Figure 7:
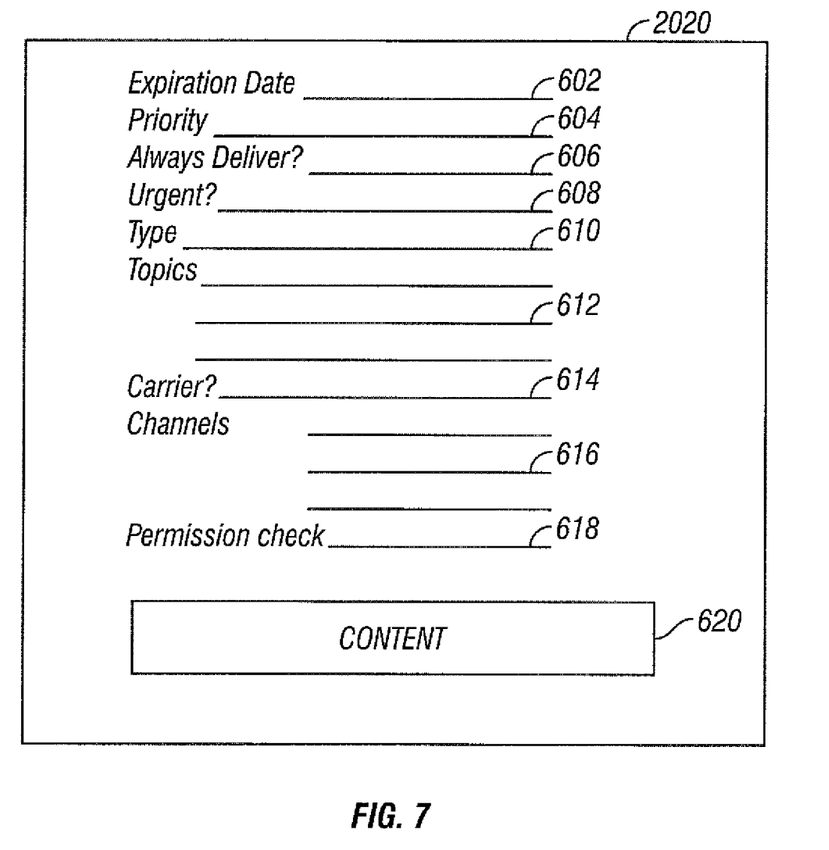
FIG. 7 is a representation of a structure for use with an embodiment of the present invention.

For aggregating messages, as shown in FIG. 7, messages can be assigned the additional properties of type 610 and topics 612. A message type indicates the kind of content contained in the message, such as informational, advertisement, or cross-sell. The message topics indicate the subjects that the message contains, such as the type of product to which an offer relates. The message topics also can refer to the source of a product or offer, where information or products from different sources may be offered.

The pacing system, in this example, still accepts messages from the message sources. Given a pool of messages, pacing system 14 can select a subset of the undelivered messages and combine them into a single message to be delivered at one time. To do this, pacing system 14 is configured with a set of rules and templates for combining messages. The rules could be, for example, "no more than two advertisements in a message," "at least one informational item in a message," and rules preventing certain message topics from being combined in a single message. For example, a rule might ensure that information about a new humidifier is not sent along with information about a new dehumidifier. These rules would work with the selection rule to determine which messages are combined into the single message. The templates describe how to format the messages. For example, informational items are placed on the left side and advertisements are placed on the right side, or two advertisements must be separated by some other type.

In addition, messages can be identified as carriers or tag-alongs (field 614 in FIG. 7). Tag-along messages are placed in a priority queue or queues. When a carrier message is about to be sent, the message source checks the tag-along queue(s) and selects one or more items to add to the carrier message in accordance with a set of rules. The rules could, for example, limit the number of tag-alongs per message or the types of tag-alongs that can be combined in a single message, and could prevent tag-along messages with certain topics from being combined with certain carrier messages or tag-along messages of specified types or topics. The templates, in this case, may describe how to format the carrier message relative to the tag-along messages, and the tag-along messages relative to each other.

Optionally, messages also can identify the channel or channels (field 616) over which a message can be sent. The channel identifier 616 may be used, for example, to determine which messages to aggregate, so that the pacing system will aggregate messages being sent over the same channel. Also, the channel identifier 616 can be used so that the pacing system can choose one of several channels to use for message delivery. This may apply, for example, to optimize aggregation or to minimize the delay before a message is sent to a particular recipient. In one embodiment, channel identifier 616 is used to determine the channel by which to send a message when the delay periods over different channels are different. Optionally, where multiple channels are identified, other fields (such as priority field 604) can have an entry for each channel.

Where recipients have the ability to "opt-out" of receiving certain messages or it may otherwise be determined that a message should not be sent to a recipient during the delay period before a message is forwarded to the recipient, messages also may be assigned a permission check property 618. Permission check property 618 can be used, similarly to expiration date property 602, to determine when a message should not be sent. For example, in a centralized pacing system, if permission check property 618 is true, the pacing system checks whether a participant has opted out of a message before sending the message on to the recipient.

For discarding similar messages, the pacing system can apply a set of precedence rules. For example, the pacing system can have a rule that a message is discarded if another message of the same or a similar type (or on the same or a similar topic) was delivered within a particular time period. Alternatively, this type of rule could be used to delay a message, so that two messages of the same or similar types (or topics) are not sent within a specified time period.

While the preceding volume management functions reduce the volume of messages (or the volume of similar messages), it may also be desirable to stimulate the sending of messages when a specified time frame has elapsed without any messages being sent. Thus, in addition to storing a minimum period between messages, the pacing system—can store an upper threshold period. If the upper threshold period is exceeded without a message being sent, the pacing system can notify the message sources.

Although some of the message volume management functions have been described in terms of a central pacing system and some in terms of a pacing storage system, it should be understood that the functions could be implemented with either type of system or a combination of the two.

While there have been shown and described examples of the present invention, it will be readily apparent to those skilled in the art that various changes and modifications may be made therein without departing from the scope of the invention as defined by the following claims. For example, the invention can be implemented with a push system, a pull system, an inbox or outbox system, or any other message delivery system. Also, timing periods could be adjusted so that, for example, all e-mails are sent on a particular day of the week or month, or low priority messages are sent only on a particular day. Furthermore, some functions of a central pacing system can be combined with some functions of a pacing storage system (allowing, for example, some messages to be sent directly from the message sources to the recipients) as part of an overall pacing system. Moreover, while some message delivery functions or properties have been described in terms of global properties and some in terms of personal properties, the delivery algorithms can apply the rules globally, at an individual level, or at a group level as desired. Accordingly, the invention is limited only by the following claims and equivalents thereto.

What is claimed is:

1. A method for managing messages comprising the steps of:
   receiving over a network, at a pacing system comprising a processor and a data storage system having a set of computer instructions executable by the processor, an indication of a first message intended for a recipient;
   sending the first message to the recipient via e-mail to an e-mail address;
   receiving over the network, by the pacing system, an indication of a second message intended for the recipient, wherein the indication of the second message is received after the first message is sent to the recipient;
   determining according to a pacing algorithm, by the pacing system, a separation between sending the first message and sending the second message to the recipient, the pacing algorithm considering a characteristic of the second message; and
   sending the second message to the recipient via email to the e-mail address.

2. The method of claim 1, wherein the method further comprises:
   determining that the second message should be sent before an expiration date of the second message; and
   sending the second message to the recipient via e-mail sooner than what would be provided for by the pacing algorithm, but the second message is not sent to the recipient immediately.

3. The method of claim 1, further comprising:
   monitoring the pacing of sending the first message and the second message to the recipient; and
   notifying a message source if the first message or the second message is not sent within a specified time period.

4. The method of claim 1, wherein the pacing system sorts two or more e-mail messages to determine the second message.

5. The method of claim 1, wherein receiving the indication of the first message comprises receiving a first e-mail intended for the recipient and receiving the indication of the second message comprises receiving a second e-mail intended for the recipient.

6. The method of claim 1, further comprising immediately sending the first message to the recipient.

7. The method of claim 1, further comprising creating a combined e-mail message by combining two or more messages intended for the recipient into a single e-mail message.

8. A system for managing e-mail messages comprising:
one or more e-mail servers;
a pacing system coupled to the one or more e-mail servers, the pacing system comprising a processor and a data storage system having a set of computer instructions executable by the processor to:
receive from the one or more e-mail servers an indication of a first message intended for a recipient;
communicate with the one or more e-mail servers to send the first message to the recipient via e-mail to an e-mail address;
receive from the one or more e-mail servers an indication of a second message intended for the recipient, wherein the indication of the second message is received after the first message is sent to the recipient;
determine according to a pacing algorithm, by the pacing system, a separation between sending the first message to the recipient and sending the second message to the recipient, the pacing algorithm considering a characteristic of the second message; and
communicate with the one or more e-mail servers to send the second message the recipient via e-mail to the e-mail address.

9. The system of claim 8, wherein the second message includes an expiration date and wherein the pacing system is further operable to:
determine that the second message should be sent before the expiration date of the second message; and
send the second message to the recipient sooner than what would be provided for by the pacing algorithm, but not immediately.

10. The system of claim 8, wherein the pacing system is further operable to create a combined e-mail message by combining two or more different messages intended for the recipient into a single e-mail message.

11. The system of claim 8, wherein receiving the indication of the first message comprises receiving the first message as a first e-mail message from the one or more e-mail servers.

12. The system of claim 11, wherein receiving the indication of the second message comprises receiving the second message as a second e-mail message from the one or more e-mail servers.

13. A computer program product comprising a non-transitory computer readable medium storing computer executable instructions, the computer executable instructions comprising instructions executable by a processor to:
receive an indication of a first message intended for a recipient;
send the first message to the recipient via e-mail to an e-mail address based on information stored in a data storage system;
receive an indication of a second message intended for the recipient, wherein the second message is received after the first message is sent;
determine according to a pacing algorithm a separation between the first message and the second message, the pacing algorithm considering a characteristic of the second message; and
send the second message to the recipient via e-mail to the e-mail address.

14. The computer program product of claim 13, wherein the second message includes an expiration date and wherein the computer executable instructions are further executable to:
determine that the second message should be sent before the expiration date of the second message; and
send the second message sooner than what would be provided for by the pacing algorithm, but not immediately.

15. The computer program product of claim 14, wherein the computer executable instructions are further executable to create a combined e-mail message by combining two or more e-mail messages intended for the recipient into a single e-mail message.

16. The computer program product of claim 15, wherein the computer executable instructions are further executable to apply a template to determine how to format the combined e-mail.

17. The computer program product of claim 13, wherein receiving the indication of the first message comprises receiving the first message as a first e-mail message.

18. The computer program product of claim 17, wherein receiving the indication of the second message comprises receiving the second message as a second e-mail message.

* * * * *